United States Patent
Ekpenyong (10) Patent No.: US 10,223,584 B2
(45) Date of Patent: Mar. 5, 2019

(54) DOCUMENT DETECTION

(71) Applicant: NCR Corporation, Duluth, GA (US)

(72) Inventor: Olufisayo Adebanke Ekpenyong, Kitchener (CA)

(73) Assignee: NCR Corporation, Atlanta, GA (US)

( * ) Notice: Subject to any disclaimer, the term of this patent is extended or adjusted under 35 U.S.C. 154(b) by 105 days.

(21) Appl. No.: 15/335,565

(22) Filed: Nov. 1, 2016

(65) Prior Publication Data
US 2018/0121718 A1    May 3, 2018

(51) Int. Cl.
| | | |
|---|---|---|
| G06K 9/00 | (2006.01) | |
| H04N 5/91 | (2006.01) | |
| G06T 3/40 | (2006.01) | |
| G06K 9/03 | (2006.01) | |
| G06Q 40/00 | (2012.01) | |

(52) U.S. Cl.
CPC ......... *G06K 9/00442* (2013.01); *G06K 9/036* (2013.01); *G06T 3/4053* (2013.01); *H04N 5/91* (2013.01); *G06K 2209/01* (2013.01); *G06Q 40/12* (2013.12)

(58) Field of Classification Search
CPC ........... G06K 9/00442; G06K 9/00718; G06K 9/4606; G06K 9/4671; G06K 9/52; G06K 2009/4666; G06T 3/4053; G06T 5/00; G06T 7/0004; G06T 2207/30108; H04N 5/91; G06Q 40/12

See application file for complete search history.

(56) References Cited

U.S. PATENT DOCUMENTS

| | | | | |
|---|---|---|---|---|
| 8,396,120 | B2* | 3/2013 | Hamilton | H04N 19/115 375/240.03 |
| 9,256,922 | B2* | 2/2016 | Zagaynov | G06T 3/4053 |
| 9,626,577 | B1* | 4/2017 | Yu | G06K 9/18 |
| 9,635,213 | B1* | 4/2017 | Terrill | H04N 1/2129 |
| 2003/0185450 | A1* | 10/2003 | Garakani | G06K 9/0014 382/232 |
| 2009/0185760 | A1* | 7/2009 | Okada | G06T 3/4069 382/299 |
| 2013/0104080 | A1* | 4/2013 | Bosworth | G06Q 10/10 715/838 |
| 2014/0032406 | A1* | 1/2014 | Roach | G06Q 20/042 705/42 |
| 2015/0161474 | A1* | 6/2015 | Jaber | G06K 9/52 382/203 |
| 2018/0025222 | A1* | 1/2018 | Yellapragada | G06K 9/00442 |

OTHER PUBLICATIONS

Peyrard, Clément, et al. "ICDAR2015 competition on text image super-resolution." Document Analysis and Recognition (ICDAR), 2015 13th International Conference on. IEEE, 2015.*

* cited by examiner

*Primary Examiner* — Jonathan S Lee
(74) *Attorney, Agent, or Firm* — Schwegman, Lundberg & Woessner (57) ABSTRACT

Video frames of a document are captured. A still image of the document is optimally automatically taken after the video frames have been recorded. The best image from the frames and the still image is determined. The best image is provided for OCR processing to derive document information represented in the best image for the document.

6 Claims, 4 Drawing Sheets

DOCUMENT DETECTION

BACKGROUND

Increasingly consumers are conducting financial transactions and performing business accounting through consumer-operated devices, such as: Self-Service Terminals (SSTs) without the assistance of a clerk and mobile device owned/operated by the consumers.

For example, it is fairly common for a consumer to now use a mobile device, such as a phone to take a picture of a check and deposit that check with a bank using a mobile application. A variety of issues are usually encountered in this process.

However, this process will typically not work well with larger documents or financial instruments, such as invoices that can be 8½ by 11 inches. Additionally, larger documents typically require better image quality than do smaller documents, such as checks for purposes of performing Optical Character Recognition (OCR) on the documents. These means that larger documents require higher resolution images for OCR than what is conventionally used for check image capture in the industry.

However, even with traditional check image capture and processing applications, there are still issues that have yet to be overcome in the industry. For example, the consumer is usually required to manually align the check image in a screen of the mobile device and press a button to snap a picture of the check; the check image is then sent from the mobile application to the bank. This can create a variety of problems that prevents the bank from being able to process the check information from the consumer-captured image, such as: 1) a poor angle used by the consumer in taking the image, 2) the image does not include all edges of the check information resulting in some information being unavailable in the check image, 3) the lighting when the image was taken was of poor quality such that the check information cannot be processed, 4) the consumer's hand was shaking when the photo was taken for whatever reason (consumer traveling, etc.) resulting in a blurred check image.

Typically, the consumer is unaware of what the problem was and the bank just reports a non-meaningful error back to the consumer that the check cannot be deposited with the bank. The consumer may or may not try again; usually the consumer thinks that something is wrong with the check itself and may call the entity that provided the check or may personally visit a bank branch in an attempt to deposit the check. Any of these options are time consuming and are undesirable situations for both the consumer and the bank.

SUMMARY

In various embodiments, document detection processing is presented.

According to an embodiment, a method for automatic document detection is provided. Specifically, frames of a video are retained as document images for a document and a still image is obtained of the document. Next, a best image is selected from the still image and the document images. Finally, the best image is provided for Optical Character Recognition (OCR) processing to derive document information represented in the best image for the document.

DETAILED DESCRIPTION

Figure 1:
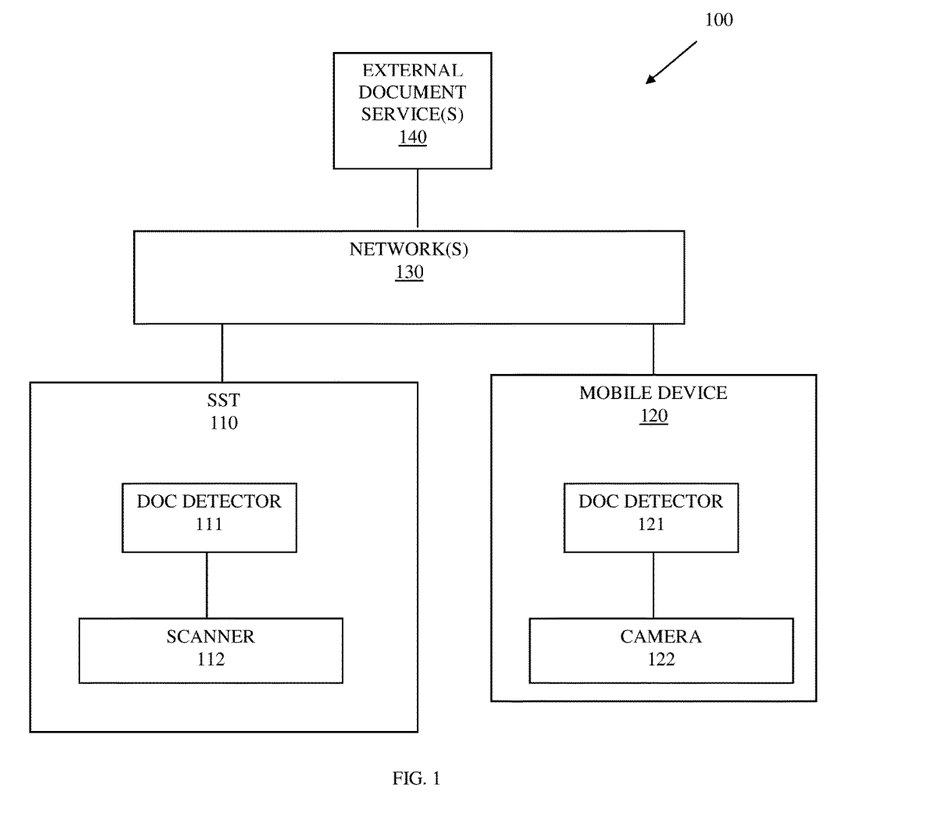
FIG. 1 is a diagram of a system for automatic document detection processing, according to an example embodiment.

FIG. 1 is a diagram of a system 100 for automatic document detection processing, according to an example embodiment. The various components are illustrated and the arrangement of the components is presented for purposes of illustration only. It is to be noted that other arrangements with more or less components are possible without departing from the automatic document detection processing presented herein and below.

The system 100 includes one or more of: a Self-Service Terminal (SST) 110 and a mobile device 120. That is, either a SST 110 or a mobile device 120 can be present in the system or both can be present.

The SST 110 includes a document detector 111 and a scanner 112 (stationary or portable and interfaced to the SST 110). The mobile device 120 includes a document detector 121 and an integrated camera 122.

The SST 110 and/or mobile device 120 connect through one or more networks 130 (wired, wireless, or a combination of wired and wireless) to one or more external document services 140.

The external document services 140 provide services relevant to document images transferred from the document detectors 111 and 121. For example, banking services, accounting services, transaction processing services, and others. The external document services 140 also perform Optical Character Recognition (OCR) on document images provided by the document detectors 111 and 121.

During operation of the mobile device 120, a mobile application that executes on one or more processors of the mobile device includes the document detector 121. A user/operator of the mobile device 120 initiates the mobile application and selects an option for capturing an image of a document (such as an invoice, a receipt, a check, a government issued photo identification card, a credit card, a debit card, a loyalty card, and the like). When the option for capturing an image of the document is selected, an integrated camera 122 of the mobile device 120 is initiated and the camera 122 begins recording video available through the lens of the camera 122.

Simultaneous to the camera 122 being initiated, the document detector 121 is initiated by the mobile application. The document detector 121 receiving the video being recorded by the camera 122.

The document detector 121 processes in three phases for: 1) determining when to automatically activate the camera 122 for capturing a still image of a document, 2) determining a best or optimal document image from frame images captured from the video, and 3) selecting a best or optimal image between the best video frame and the still picture image for sending to the external document service 140 over the network 130 for OCR processing by the external document service 140.

In phase one processing, the document detector 121, as soon as it is initiated, begins processing frames of images that are being captured by the camera 122 for determining within a few seconds (approximately 1 to 3 seconds) the frames per second (FPS) that the camera 122 is capturing video of the document as the user operator maneuvers the camera lens over the document. This first few seconds also allows for time to account for the time it takes the consumer from selecting the option to capture an image of the document to steady the camera over the document for which an image is to be taken.

During this time, the document detector 121 also calculates the number of frames being taken by the video of the camera 122 to retain in a memory buffer of the mobile device 120. That is, the size of the buffer to house frames that are being processed is determined. The size of the buffer is calculated as a percentage of the FPS. By calculating the size of the buffer as a percentage of the FPS captured by the camera 122, consistent results can be provided across different mobile devices 120 that have varying levels of FPS for their integrated cameras 122. In an embodiment, the buffer size is approximately 70-80% of the FPS captured by the camera 122. In an embodiment, the percentage for the buffer size can be a configurable parameter that is obtained and processed by the document detector 121.

After the FPS and buffer size are determined during the first phase of processing by the document detector 121, the frames (images of the video of the document) are retained in the buffer with first entries into the buffer being older in time images than later entries into the buffer. That is, a last entry into the buffer is a more-recent in time image of the document than a preceding entry for an image in the buffer. So, entries in the buffer are time sequenced, each entry representing a timed-sequential frame that is an image of the document captured in a live video feed by the camera 122.

As images of the document appear in the frames of the buffer, the document detector 121 keeps track of document edges (e.g., the perimeter and corners of the document identified by rectangles). As the buffer is filled (with new frames coming in from the live video feed of the camera 122), older images of the document are dropped out of the buffer (so images with the oldest time-sequence are replaced with the newer captured images).

When a frame is processed, the document detector 121 makes a determination as to whether the document region of interest can be identified from the video frames. If that is successful, a still image of the document can be automatically captured by activating the camera 122 to take a still image. This is done automatically and without the user-operator having to manually activate a button on the mobile device 120 to take the still image. Moreover, and typically, the quality of a still image is better than the frames captured in the live video feed. That is, the density of the pixels per-square inch is greater in a captured still image than it is within frames of the live video feed.

The document detector 121 determines whether a still image of the document is to be automatically captured by activating the camera 122 by:

1) Determining once a configurable number (N) of frames (results) are captured in the buffer whether approximately 70% (Z % where Z % can be preconfigured) of the identified rectangle edges are congruent to one another, rectangles R1 and R2 are congruent if all of the following is true:
   a) all corresponding edges of R1 and R2 are within approximately 2-3% (x % where x % can be preconfigured) in length apart (top/bottom width of R1 is within 2-3% of the top/bottom width of R2, left/right height of R1 is within 2-3% of left/right height of R2;
   b) areas of R1 and R2 are within approximately 2-3% (y % where y % can be preconfigured) apart; and
   c) centers of R1 and R2 are within 2-3% (n % where n % can be preconfigured) apart.
2) Adjacent rectangles are tested in the buffer for congruency. So, for example if there are 8 rectangles in the frame images stored in the buffer (where buffer size is 8), rectangles R1-R8 are tested for congruency.
3) If a certain percentage (preconfigured) of the rectangles noted from the frame images in the buffer are congruent to one another, then a determination is made that the document edges (4 edges) have been successfully identified with enough accuracy that the document detector 121 can activate the camera 122 and take a high quality image of the document automatically and without any user action for the image (picture) to be taken by the mobile device 120.

If a configurable number of seconds, such as approximately 7 seconds, have elapsed from the time that the camera 122 was first initiated for capturing an image of the document and the document detector 122 did not yet automatically activate the camera 122 for taking a high quality picture (image) of the document, then the document detector 121 reports this to the mobile application and the user is presented with a message on a screen of the mobile device's display to manually take a picture of the document.

During a second phase of processing for the document detector 121, the document detector 121 determines an optimal or best quality image that exists in the buffer when an image of the document was automatically taken by the document detector 121. Here, the document detector 121 performs four processing components (it is also to be noted, that if a user were to manually take a photograph/image of the document, the processing below can be omitted):

1) Finding the most popular rectangle image in the frame images of the buffer. This is the rectangle in the frame images that has the most other rectangles in the remaining frame images that are congruent to it. Each frame image of the document is housed in a buffer location and each frame image includes the rectangle (outer edges of the document image). So, each rectangle in each buffer location includes a counter, the counter is incremented when another rectangle in another buffer location is determined to be congruent (as described above) to the rectangle being processed. When each rectangle has been compared against the remaining rectangles in the buffer, the frame image having the highest counter value is determined to be the most popular frame image (rectangle). If multiple buffer locations have a same highest counter value, then the buffer location having a most-recent frame taken from the camera 122 is retained as the most popular rectangle. The pixel values included within the rectangle of the most popular rectangle is said to be the most accurate region of interest.
2) Discarding of the other frames in the buffer, which are not congruent with the most popular rectangle. This leaves the most popular rectangle and the frames that have a rectangle that is congruent to the most popular rectangle, such that any frames in the buffer that are not congruent to the most popular rectangle are discarded for further consideration and processing.
3) Computing a focus score for the remaining frames in the buffer. Here, the document detector 121 processes a Laplacian algorithm. Moreover, the region of interest (pixels surrounded by the outer rectangle (outer 4 edges of the document)) is processed to remove noise from the pixels in the region of interest using a Gaussian filter. Next, the pixels with noise reduced are converted to greyscale pixels. Then, the Laplacian algorithm is processed to enhance values of the edge pixels. Finally, variances for the pixels in the region of interest are computed for each of the images to obtain a focus score for each of the images. The image with the highest focus score is noted.

4) Selecting one of the remaining images in the buffer based on each images focus score. Each remaining image's focus score is compared to determine whether the focus score is within a predefined percentage (configurable percentage) of the noted highest focus score. This is done to select the most-recent in time taken document image by the camera 122 and accounts for when the user moved closer to the region of interest (area inside the outer edges) with the camera 122.

In phase three, the document detector 121 chooses between the retained frame image from the buffer (achieved in phase 2 above) and the captured image (achieved in phase 1 above). As discussed above, the resolution (quality) of the camera 121 when capturing the frames of the video is typically much lower than the resolution (quality) of the camera 121 when a still image is captured. To account for user hand shaking at a last moment between when the camera 121 was instructed to take the still image in phase 1, a selection is made between the optimal region of interest in the retained frame buffer of phase 2 and the still picture taken in phase 1. So, the document detector performs the following processing when selecting between the two images (the higher resolution still image and the lower resolution remaining video frame image):

1) increasing the resolution of the retained video frame image to the resolution associated with the still and automatically taken image, such that both images have the same dimensions and size for comparison with one another;

2) processing the Laplacian algorithm (as was done in phase 2) for calculating each image's focus score for the region of interest (pixels surrounded by the 4 edges of the document), where the higher the score the sharper the focus is said to be; and 3) select between the retained and resolution enhanced frame image and the still image automatically taken by taking the image with the highest computed focus score for the region of interest. If the resolution enhanced frame image has the highest focus score, then the resolution enhanced frame image is retained in its enhanced (not original) format.

The optimal determined image for the document (phases 1-3) is then sent from the mobile device 120 over the network 130 to the external document service 140 for OCR processing on the region of interest included in the optimal determined image.

The processing for document detection in a series of video captured frame images and a still camera-captured image to select an optimal image for OCR processing as described above for the mobile device 120 can be similarly processed by the document detector 111 of a SST 110. In instances where the scanner/camera 112 is stationary (not a portable handheld scanner 112) processes in a similar manner; however, in these instances (with a stationary scanner/camera 112) the document as presented to the scanner/camera 112 moves closer, farther away, right to left, up and down, left to right while the scanner/camera lens remains stationary (in the prior mobile device-presented embodiments the camera lens moved while the document remained stationary).

In an embodiment, the mobile device 120 is a phone.

In an embodiment, the mobile device 120 is a tablet computer.

In an embodiment, the mobile device 120 is a wearable processing device.

In an embodiment, the mobile device 120 is a network-connected camera.

In an embodiment, the mobile device 120 is a laptop computer.

In an embodiment, the mobile device 120 is an intelligent appliance having a network addresses and processing capabilities such that it is capable of being part of the Internet of Things (IoTs).

In an embodiment, the SST 110 is an Automated Teller Machine (ATM).

In an embodiment, the SST 110 is a kiosk.

In an embodiment, the SST 110 is a self-service checkout station.

In an embodiment, the SST 110 is a Point-Of-Sale (POS) terminal operated by a clerk on behalf of customers.

In an embodiment, the document is a large document that is larger than a consumer identification or credit card. In an embodiment, the document is larger than letter size (8½ inches by 11 inches). In an embodiment, the document is a consumer invoice.

One now appreciates how the above-noted processing can be used as a preprocess to obtain an optimal document image for an external document service 140 for purposes of OCR processing on data or information represented in the pixels of the image. Moreover, as discussed above, the consumer need not manually take a picture of the document with the scanner/camera (112 or 122) of the device 110 or 120 as the processing is capable of automatically taking such an image and the optimal image is selected from all images taken of the document (automatically recorded video frames and automatic still picture). The processing also accounts for user-introduced errors, such as hand shaking or movement of the device, lighting in the environment where the device (110 or 120) is being operated, angle of lens of the camera (112 or 122) relative to the presented document, etc. This results in better OCR performance to translate the document information for performing a transaction with the external service 140.

These and other embodiments are now discussed with reference to the FIGS. 2-4.

Figure 2:
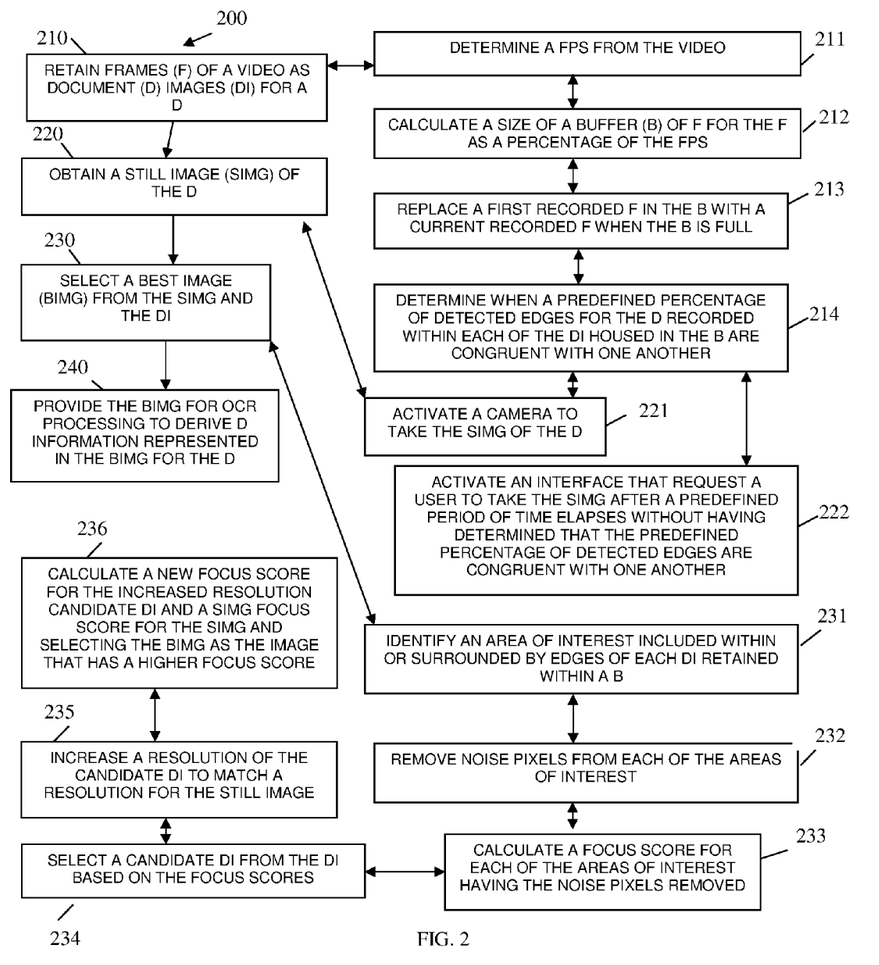
FIG. 2 is a diagram of a method for automatic document detection, according to an example embodiment.

FIG. 2 is a diagram of a method 200 for automatic document detection, according to an example embodiment. The software module(s) that implements the method 200 is referred to as an "image selector." The image selector is implemented as executable instructions programmed and residing within memory and/or a non-transitory computer-readable (processor-readable) storage medium and executed by one or more processors of a device. The processor(s) of the device that executes the image selector are configured and programmed to process the image selector. The image selector has access to one or more networks during its processing. The networks can be wired, wireless, or a combination of wired and wireless.

In an embodiment, the device that processes the image selector is the mobile device 120. In an embodiment, the mobile device 120 is one of: a phone, a tablet computer, a laptop computer, a wearable processing device, and a device that is part of the IoTs.

In an embodiment, the image selector is the document detector 121.

In an embodiment, the device that processes the image selector is the SST 110. In an embodiment, the SST 110 is one of: a POS terminal operated by a clerk, an ATM, and a kiosk.

In an embodiment, the image selector is the document detector 112.

The device that executes the image selector includes an integrated or interfaced camera. The camera includes video capabilities and still picture taking capabilities. In an embodiment, the camera is a scanner.

In an embodiment, image selector is a subcomponent or integrated module of an application processing on the device where that application is capable of network communication to a remote and external document service, such as a banking/financial service, retail service, accounting service, etc. The application having a user-facing interface for interacting with the user who is operating the device for capturing an image of a document and sending the document image to the external document service for further processing that at least includes OCR processing on the document image to identify document information from the document image.

In an embodiment, the image selector executes on a device that also performs the OCR on the document image. In these embodiments, the device that executes the image selector can be any of the above-mentioned devices or other devices, such as a standalone printer/scanner, a desktop computer, and the like.

At 210, the image selector retains frames of a video as document images for a document. That is, a camera is activated in video mode and the lens of the camera is focused on a document and a video recording is made of the document as a series of frames, each frame being a document image for the document.

According to an embodiment, at 211, the image selector determines a frames per second (FPS) that the camera is capturing for the video of the document.

In an embodiment of 211 and at 212, the image selector calculates a size of a memory buffer for the frames as a percentage of the FPS. In an embodiment, the percentage is approximately 70-80%, such that the memory buffer is 70-80% the size of the FPS noted for the video as captured by the camera.

In an embodiment of 212 and at 213, the image selector replaces a first recorded frame in the buffer with a current recorded frame when the buffer is full. That is, as new frames are recorded those new frames replace the oldest (earliest recorded) frames present in the buffer, such that the buffer size is retained as the predefined percentage of the FPS.

In an embodiment of 213 and at 214, the image selector determines when a predefined percentage of detected edges for the document recorded within each of the document images housed in the buffer are congruent with one another. The manner of determining congruency was discussed above with the FIG. 1.

At 220, the image selector obtains a still image of the document. The still image is of a higher resolution than the document images identified in the frames captured by the video.

In an embodiment of 214 and 220, at 221, the image selector activates a camera to take the still image of the document.

In an embodiment of 214 and 220, at 222, the image selector activates an interface that requests a user to take the still image after a predefined time elapses without having determined that the predefined percentage of detected edges are congruent with one another.

At 230, the image selector selects a best image from the still image and the document images.

According to an embodiment, at 231, the image selector identifies an area of interest included within or surrounding by edges of each document image retained within a memory buffer.

In an embodiment of 231 and at 232, the image selector removes noise pixels from each of the areas of interest.

In an embodiment of 232 and at 233, the image selector calculates a focus score for each of the areas of interest having the noise pixels removed.

In an embodiment of 233 and at 234, the image selector selects a candidate document image from the document images based on the focus scores.

In an embodiment of 234 and at 235, the image selector increases a resolution of the candidate document image to match a resolution for the still image.

In an embodiment of 235 and at 236, the image selector calculates a new focus score for the increased resolution candidate document image and a still image focus score for the still image, and the image selector selects the best image as the image that has a higher focus score.

At 240, the image selector provides the best image for OCR processing to derive document information represented in the pixels of the best image for the document.

Figure 3:
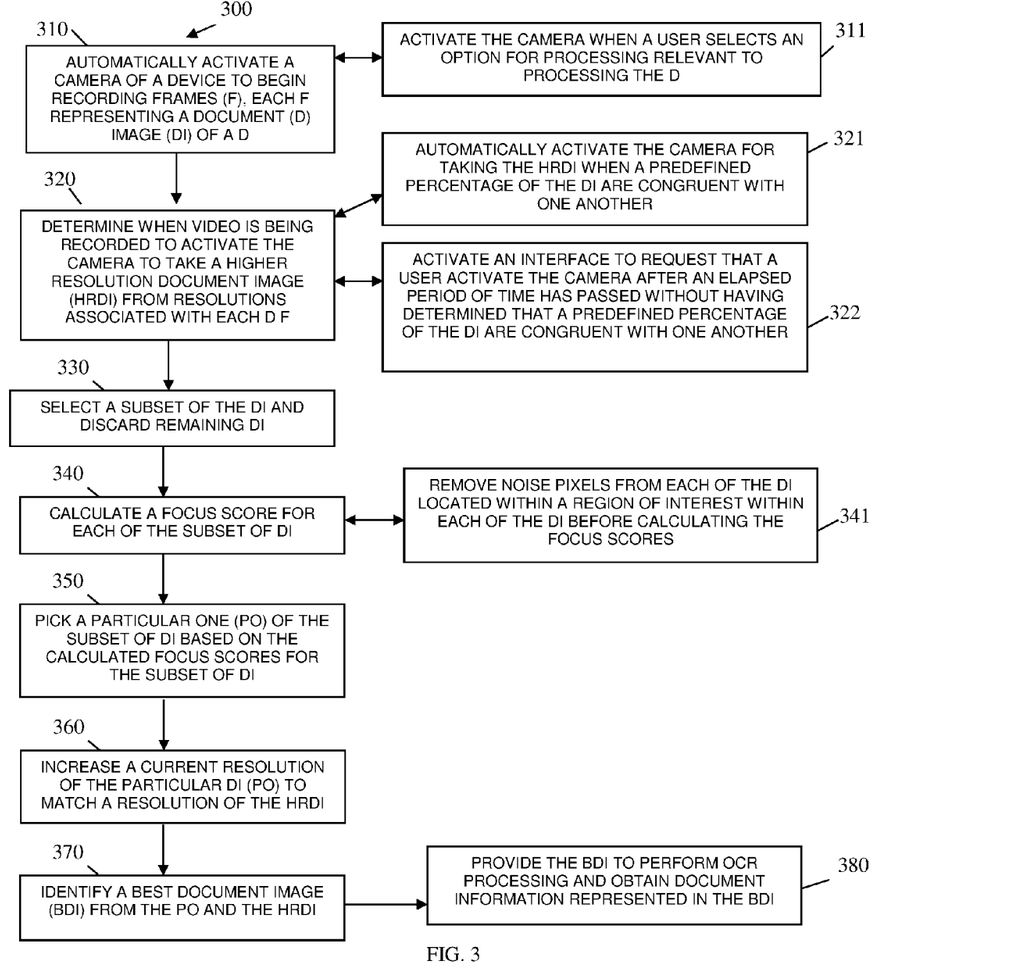
FIG. 3 is a diagram of another method for automatic document detection, according to an example embodiment.

FIG. 3 is a diagram of another method 300 for automatic document detection, according to an example embodiment. The software module(s) that implement the method 300 is referred to herein as an "optimal document image selector." The optimal document image selector is implemented as executable instructions and programmed within memory and/or a non-transitory computer-readable (processor-readable) storage medium that executes on one or more processors of a device. The processors of the device are specifically configured to execute the optimal document image selector. The optimal document image selector can access one or more networks; the networks can be wired, wireless, or a combination of wired and wireless.

The optimal document image selector presents another and in some ways enhanced processing perspective of the image selector (discussed above with reference to the FIG. 2).

In an embodiment, the optimal document image selector is the image selector of the FIG. 2.

In an embodiment, the device that processes the optimal document image selector is the mobile device 120. In an embodiment, the mobile device 120 is one of: a phone, a tablet computer, a laptop computer, a wearable processing device, and a device that is part of the IoTs.

In an embodiment, the optimal document image selector is the document detector 121.

In an embodiment, the device that processes the optimal document image selector is the SST 110. In an embodiment, the SST 110 is one of: a POS terminal operated by a clerk, an ATM, and a kiosk.

In an embodiment, the optimal document image selector is the document detector 112.

The device that executes the optimal document image selector includes an integrated or interfaced camera. The camera includes video capabilities and still picture taking capabilities. In an embodiment, the camera is a scanner.

In an embodiment, the optimal document image selector is a subcomponent or integrated module of an application processing on the device where that application is capable of network communication to a remote and external document service, such as a banking/financial service, retail service, accounting service, etc. The application having a user-facing interface for interacting with the user who is operating the device for capturing an image of a document and sending the document image to the external document service for further processing that at least includes OCR processing on the document image to identify document information from the document image.

In an embodiment, the optimal document image selector executes on a device that also performs the OCR on the document image. In these embodiments, the device that executes the optimal document image selector can be any of the above-mentioned devices or other devices, such as a standalone printer/scanner, a desktop computer, and the like.

At 310, the optimal document image selector automatically activates a camera of a device to begin recording frames, each frame representing a document image of a document.

According to an embodiment, at 311, the optimal document image selector activates the camera when a user selects an option for processing relevant to processing the document. For example, such as a retail invoice processing application for capturing the document image as an image of an invoice, or such as a bank processing application for capturing a check image as an image of check for deposit into an account of the user.

At 320, the optimal document image selector determines when video is being recorded to activate the camera to take a higher resolution document image.

In an embodiment, at 321, the optimal document image selector automatically activates the camera for taking the higher resolution image when a predefined percentage of the document images are congruent with one another.

In an embodiment, at 322, the optimal document image selector activates an interface to request that a user activate the camera after an elapsed period of time has passed without having determined that a predefined percentage of the document images are congruent with one another.

At 330, the optimal document image selector selects a subset of the document images and discards remaining ones of the document images.

At 340, the optimal document image selector removes noise pixels from each of the document images located within a region of interest within each of the document images before calculating the focus scores.

At 350, the optimal document image selector picks a particular one of the subset of document images based on the calculated focus scores for the subset of documents.

At 360, the optimal document image selector increases a current resolution of the particular document image to match a resolution of the higher resolution document image.

At 370, the optimal document image selector identifies a best document image from the particular image (which has the increased resolution) and the higher resolution document image.

At 380, the optimal document image selector provides the best document image to perform OCR processing and obtain document information represented in the pixels of the best document image.

Figure 4:
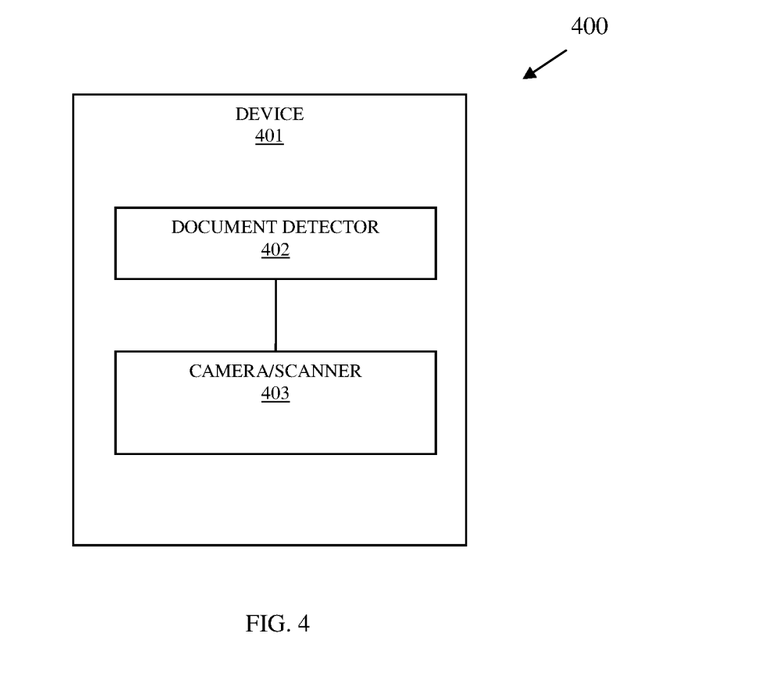
FIG. 4 is a diagram of device that performs automatic document detection processing, according to an example embodiment.

In an embodiment, at 341, the optimal document image selector activates an interface to request that a user activate the camera after an elapsed period of time has passed FIG. 4 is a diagram of device 400 that performs automatic document detection processing, according to an example embodiment. The components of the device 401 are programmed and reside within memory and/or a non-transitory computer-readable medium and execute on one or more processors of the device 401. The device 401 has access and can communicate over one or more networks; and the networks can be wired, wireless, or a combination of wired and wireless.

In an embodiment, the device 400 performs the processing, inter alia, of the FIGS. 1-3.

In an embodiment, the device 400 is the mobile device 120. In an embodiment, the mobile device 120 is one of: a phone, a tablet computer, a laptop computer, a wearable processing device, and a device that is part of the IoTs.

In an embodiment, the device 400 is the SST 110. In an embodiment, the SST 110 is one of: a POS terminal operated by a clerk, an ATM, and a kiosk.

In an embodiment, the device 400 is a standalone scanner/printer.

In an embodiment, the device 400 is a desktop computer.

The device 401 includes a document detector 402 and a camera/scanner 403.

The document detector 402 is operable to: 1) execute on one or more hardware processors of the device 401, 2) activate the camera/scanner 403 to capture video frames from video taken of a document (each frame including a document image), 3) activate the camera/scanner 403 while the video frames are being captured to take a higher resolution document image, 4) select a particular one of the document images from the captured video frames based on calculated focus scores for each of the document images, and 5) provide either the particular document image or the higher resolution document image as an optimal document image to an OCR process for identifying document information represented in pixels of the optimal document image.

In an embodiment, the document detector 402 is the document detector 111.

In an embodiment, the document detector 402 is the document detector 121.

In an embodiment, the document detector 402 is the image selector of the FIG. 2.

In an embodiment, the document detector 402 is the optimal document image selector of the FIG. 3.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

retaining frames of a video as document images for a document in a buffer;

obtaining a still image of the document;

selecting a best image from the still image and the document images, including identifying an area of interest included within or surrounded by edges of each document image retained within the buffer;

wherein identifying includes removing noise pixels from each of the areas of interest;

wherein removing includes calculating a focus score for each of the areas of interest having the noise pixels removed;

wherein calculating includes selecting a candidate document image from the document images based on the focus scores;

wherein selecting further includes increasing a resolution of the candidate document image to match a resolution for the still image;

wherein increasing includes calculating a new focus score for an increased resolution candidate document image and a still image focus score for the still image and selecting the best image as the image that has a higher focus score; and providing the best image for Optical Character Recognition processing to derive document information represented in the best image for the document.

2. A method, comprising:

automatically activating a camera of a device to begin recording frames, each frame representing a document image of a document;

determining when video is being recorded to activate the camera to take a higher resolution document image;

selecting a subset of the document images and discarding remaining document images;

calculating a focus score for each of the subset of document images;

picking a particular one of the subset of document images based on the calculated focus scores for the subset of document images;

increasing a current resolution of the particular document image to match a resolution of the higher resolution document image;

identifying a best document image from the particular document image and the higher resolution document image; and providing the best document image to perform Optical Character Recognition (OCR) processing and obtaining document information represented in the best document image.

3. The method of claim 2, wherein automatically activating further includes activating the camera when a user selects an option for processing relevant to processing the document.

4. The method of claim 2, wherein determining further includes automatically activating the camera for taking the higher resolution document image when a predefined percentage of the document images are congruent with one another.

5. The method of claim 2, wherein determining further includes activating an interface to request that a user activate the camera after an elapsed period of time has passed without having determined that a predefined percentage of the document images are congruent with one another.

6. A method, comprising:

retaining frames of a video as document images for a document in a buffer;

obtaining a still image of the document;

identifying an area of interest included within or surrounded by edges of each document image retained within the buffer;

removing noise pixels from each of the areas of interest of each document image;

calculating a focus score for each of the areas of interest having the noise pixels removed;

selecting candidate document images from the document images having the highest focus scores;

increasing resolutions of the candidate document images to match a resolution for the still image;

calculating new focus scores for increased resolution candidate document images and a still image focus score for the still image; and selecting a best image as the increased resolution candidate document image that has a highest new focus score; and providing the best image for Optical Character Recognition processing to derive document information represented in the best image for the document.

* * * * *